United States Patent Office 3,732,185
Patented May 8, 1973

---

3,732,185
POLYPARABANIC ACID DERIVATIVES
Jurgen Hocker, Cologne, and Rudolf Merten, Leverkusen, Germany, assignors to Bayer Aktiengesellschaft
No Drawing. Filed June 28, 1971, Ser. No. 157,742
Claims priority, application Germany, June 29, 1970,
P 20 32 077.8
Int. Cl. C08g 22/02
U.S. Cl. 260—77.5 CH         9 Claims

ABSTRACT OF THE DISCLOSURE

Polyparabanic acid derivatives which contain the structural unit:

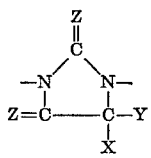  (I)

repeatedly in one molecule; in this structural unit
Z=O or S;
X and Y, which may be the same or different, represent radicals of the formula —NR$_1$R$_2$; —OR$_1$ or —SR$_1$, where
  R$_1$ represents an optionally substituted alkyl, optionally substituted alkyl, optionally substituted cycloalkyl or optionally substituted aryl radical, and
  R$_2$ represents hydrogen or has the same meaning as R$_1$, or
  R$_1$ and R$_2$ together can also represent an alkylene or arylene radical which joins X and Y together to form a ring, and process for their production.

---

This invention relates to polymers which contain the structural unit:

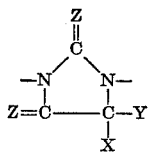  (I)

repeatedly in one molecule. In this structural unit, the symbols have the following meanings:

Z represents O or S; and
X and Y, which may be the same or different, represent radicals of the formula —NR$_1$R$_2$, —OR$_1$ or —SR$_1$, wherein
  R$_1$ represents optionally substituted alkyl, optionally substituted cycloalkyl, or optionally substituted aryl, and
  R$_2$ represents hydrogen or has the same meaning as R$_1$, or
  R$_1$ and R$_2$ together can also represent an alkylene (preferably C$_2$–C$_5$) or arylene (preferably phenylene) radical which joins X and Y together to form a ring.

These polymers are referred to herein as polyparabanic acid derivatives.

More particularly, they are high temperature-resistant plastics which are particularly suitable for use as raw materials for lacquers and in which the recurring units of Formula I are joined together by radicals W. The radical W is an optionally substituted hydrocarbon radical containing at least two carbon atoms and having a valence of from 2 to 4.

The polyparabanic acid derivatives according to the invention preferably have molecular weight of from 500 to 50,000, most preferably from 4000 to 30,000. They show characteristic infra-red absorption at 1730 to 1740 cm.$^{-1}$ (strong) and at 1780 to 1800 cm.$^{-1}$ (weak), which may be used to identify them.

The radicals defined above preferably have the following meaning:

W is a divalent, trivalent or tetravalent hydrocarbon radical, for example a saturated aliphatic radical with up to 20 carbon atoms, which can be substituted by halogen such as chlorine or by aryl, an aromatic radical with up to 20 carbon atoms which can be substituted by halogen such as chlorine or by alkyl, a diaryl ether radical, or a radical which is derived from alkyl or aryl ethers of organic or inorganic acids. In other words, the radicals in question are radicals of conventional diisocyanates and polyisocyanates of the kind mentioned by way of example below. In the polymers according to the invention, the 2, 3, or 4 available valences of these radicals are satisfied by rings of Formula I.

R$_1$ preferably represents an alkyl radical with 1 to 6 carbon atoms which can be substituted, for example, by halogen such as chlorine or by alkoxy; a cycloalkyl radical with 5 to 7 carbon atoms which can be substituted, for example, by halogen such as chlorine or alkoxy; an aryl radical, for example a phenyl, naphthyl, diphenyl or diphenyl ether radical which can be substituted, for example by halogen, alkyl, alkoxy or amino groups.

R$_2$ has the same meaning as R$_1$ or represents hydrogen.
Specific radicals W, R$_1$ and R$_2$ are apparent from the starting materials used for the production of the polyparabanic acid derivatives specifically set out below.

The polyparabanic acid derivatives according to the invention can be prepared in different ways. Formally, all the methods of preparation are based on the combination of two isocyanate groups in a polyisocyanate with one radical of the formula:

  (II)

In the context of the invention, polyisocyanates are diisocyanates, diisothiocyanates, polyisocyanates and polyisothiocyanates with up to four NCO or NCS groups per molecule. The expression "polyisocyanates" is always used in this sense herein.

In principle, any known polyisocyanate (as hereinbefore defined) can be used, for the production of the polymers according to the invention, although it is preferred to use aliphatic, cycloaliphatic or aromatic compounds with at least two NCO or NCS groups in the molecule. Examples include polymethylene diisocyanates of the formula:

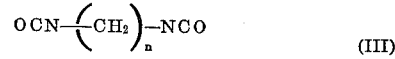  (III)

in which
n represents a number from 4 to 8,
2,2,4-trimethylhexamethylene diisocyanate, cyclohexane-1,3- or -1,4-diisocyanate, isophorone diisocyanate, optionally alkyl-substituted arylene diisocyanates such as m- and p-phenylene diisocyanates, tolylene-2,4- and -2,6-diisocyanate, chloro-p-phenylene diisocyanates, diphenylmethane diisocyanates, naphthylene diisocyanates, diphenyl ether diisocyanates, ester isocyanates such as lysine ester diisocyanates, triisocyanato-aryl phosphoric (thio)-esters or glycol-di-p-isocyanato-phenyl esters. It is also possible to use partly polymerised isocyanates with isocyanurate rings and free NCO groups or masked isocyanates.

Instead of the aforementioned polyisocyanates, the corresponding isothiocyanates can be similarly used.

The first method for preparing polyparabanic acid derivatives comprises reacting an electron-rich olefinically unsaturated compound and a polyisocyanate, optionally in an inert organic solvent, and optionally in the presence of a catalyst, preferably at a temperature in the range from 20 to 500° C.

Electron-rich olefinically unsaturated compounds are ethylene derivatives of the formula:

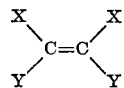

(IV)

in which X and Y have the meanings given above.

In principle, therefore, both the carbon atoms of the ethylene skeleton have to be linked to two atoms with free electron pairs. More particularly, these are nitrogen, oxygen, and sulphur. The other substituents of these atoms, i.e. the radicals $R_1$ and $R_2$, initially take no part in the reaction. Accordingly, their choice is substantially arbitrary and the only requirement they have to satisfy is that they should be inert under the reaction conditions.

Suitable representatives of the electron-rich olefinically unsaturated compounds include, for example:

Bis-[1.3-diaryl-imidazolidinylidene-(2)] such as
Bis-[1.3-diphenyl-imidazolidinylidene-(2)],
Bis-[1.3-dicycloalkyl-imidazolidinylidene-(2)] such as
Bis-[1.3-dicyclohexyl-imidazolidinylidene-(2)],
Bis-[1.3-dialkyl-imidazolidinylidene-(2)] such as
Bis-[1.3-diethyl-imidazolidinylidene - (2)]; further sonic tetrakis (dialkylamino)ethylene and
Tetrakis (N-heterocyclo) ethylene such as
Tetrakis (N-pyrrolidinyl)ethylene
Tetrakis (N-piperidino)ethylene or
Tetrakis (N-morpholino)ethylene In general, the process is carried out by reacting the two starting components in an organic solvent preferably at 20 to 500° C. The polymer formed remains in solution or is precipitated. It can be isolated by distilling off the solvent. The quantities in which the starting substances are used range from 0.5 to 10 mols, preferably around 4 mols, of isocyanate or isothiocyanate groups per mol of olefinically unsaturated compound. Solvents suitable for use in the process are compounds that are inert to NCO groups and to the olefins used, for example aromatic hydrocarbons, aromatic chlorohydrocarbons, benzonitrile, aliphatic hydrocarbons, esters and ketones. Toluene, xylene, mesitylene, chlorobenzene und dichlorobenzene are particularly suitable. It is also possible, however, to react the components in bulk.

The reaction times are usually from 30 minutes to 100 hours, preferably from 2 to 10 hours, although in special instances they can be longer or shorter.

The reaction temperatures are preferably in the range from 20 to 500° C., depending on the starting material. The reaction is most preferably carried out at a temperature from 80 to 350° C., the best results being obtained at a temperature in the range from 100 to 200° C.

The polymerisation reaction can be carried out in the presence of a catalyst, for example a metal alcoholate or a tertiary amine.

In the polymerisation reaction according to the invention, two NCO or NCS groups, for example, react with half the ethylene molecule to form a parabanic acid ring, one of whose carbonyl groups is (thio)acetalised or aminalised.

This reaction can be symbolised as follows:

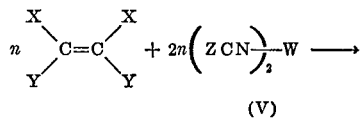

(V)

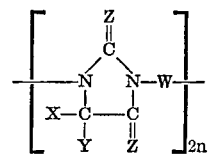

In this equation, the general symbols W, X, Y and Z have the meanings given above.

A second process for the production of the polyparabanic acid derivatives according to the invention comprises reacting a polyisocyanate with a methane derivative of the formula:

(VI)

in which X and Y can be the same or different and have the meanings given above, optionally in an inert organic solvent at a temperature of from $-100$ to $+500°$ C.

Particularly suitably methane derivatives of Formula VI include othoformic acid alkyl or aryl esters, and corresponding thio derivatives, for example orthoformic acid triethyl ester, orthoformic acid amides, N,N-dimethyl formamide diethyl acetal and tetraalkyl formamidine alkyl esters, for example methyl or ethyl ester.

In general, the process is carried out by reacting the two components, optionally in an organic solvent, depending on the structure of the components, and optionally under pressure, for a period of from 1 to 200 hours, preferably from 5 to 50 hours, at a temperature of from $-100$ to $+500°$ C., preferably from 50–200° C. The solid or liquid polymer formed remains in solution or is precipitated. In some instances, the polymer can be isolated by removing the solvent, in other instances by adding an organic precipitant, for example ether or petroleum ether. The quantities in which the starting substances are used can be selected in such a way that 0.01 to 10 mols of iso(thio)cyanate are available per mol of methane derivatives. Solvents useful for the process include compounds which are inert to NCO or NCS groups and to the methane derivative used, for example aromatic hydrocarbons, aromatic chlorohydrocarbons, benzonitrile, aliphatic hydrocarbons, esters and ketones. The methane derivative itself and toluene, xylene, mesitylene, chlorobenzene and dichlorobenzene are particularly suitable. It is also possible, however, to react the components in bulk. The degree of polymerisation can be influenced by suitably selecting the reaction time and the reaction temperature.

The reaction times range from a few seconds to 200 hours, preferably from 2 to 20 hours, although in some instances they can even be longer.

Depending on the starting material, the reaction temperatures are in the range from $-100°$ C. to 500° C. The reaction is preferably carried out at a temperature of from 50 to 200° C.

In the polymerisation reaction according to the invention, two NCO or NCS groups react with the methane derivative, accompanied by elimination of HX or HY, to form a parabanic acid ring, one of whose carbonyl groups is (thio)acetalised or aminalised.

This reaction can be symbolised by the following equation:

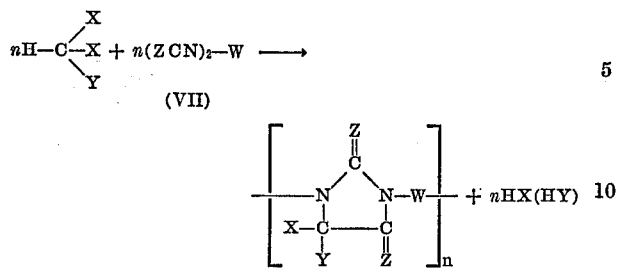

In this equation, the symbols W, X, Y and Z have the meanings given above.

A third process for the production of the polyparabanic acid derivatives according to the invention comprises reacting a polyisocyanate and a base with a compound corresponding to the formula:

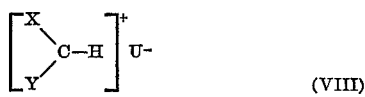

wherein X and Y have the meanings given above, and U represents an organic or inorganic anion, optionally in an organic or inorganic solvent, and optionally in the presence of a catalyst, at a temperature in the range from $-100°$ C. to $+500°$ C.

Examples of compounds of Formula VIII include 1,3-diphenyl-imidazolium chloride, N-methylbenzthiazolium chloride and 3,4,5-trimethylthiazolium methosulphate.

The radical U in Formula VIII represents an organic or inorganic anion, such as $Cl^-$, $Br^-$, $I^-$, $HSO_4^-$, $CH_3SO_4^-$, $ClO_4^-$, $CN^-$, $H_2PO_4^-$, $NO_3^-$ or $HSO_3^-$.

Suitable bases include any of the usual organic or inorganic bases, more particularly mono-, di- and trialkyl-amines having linear or branched alkyl radicals; cycloalkylamines; heterocyclic compounds containing at least one nitrogen atom in the ring, for example pyridine, piperidine or morpholine; metal alcoholates, for example sodium ethoxide, sodium methoxide, sodium isopropoxide or sodium triphenylmethoxide; and organometallic compounds, for example lithium alkyls and mesityl magnesium bromide.

In general, the process is carried out by treating a salt of General Formula VIII and a polyisocyanate, optionally in an organic or inorganic solvent, with a base. The solid or liquid polymer remains in solution or is precipitated. The quantity in which the starting substances are used can be selected in such a way that from 0.01 to 10 mols of iso(thio)cyanate, preferably 1–3 mols and 0.5 to 2 mols of amine, preferably one mol are available per mol of salt of the General Formula VIII. Solvents suitable for use in the process include compounds which are inert to NCO or NCS groups and the salts of General Formula VIII, for example aromatic hydrocarbons, aromatic chlorohydrocarbons, benzonitrile, aliphatic hydrocarbons, esters and ketones, and, in special instances, even water. Acetone, acetonitrile, dimethyl formamide and dimethyl sulphoxide have proved to be particularly suitable. The reaction can be carried out in solution or in suspension. It is also possible to react the components in bulk.

The reaction times range from a few seconds to 200 hours. The reaction is carried out at a temperature of from $-100°$ C. to $+500°$ C., preferably at a temperature of from 0 to $100°$ C.

In the polymerisation reaction according to the invention, two NCO-(NCS)-groups react formally with one carbene formed from the salt of General Formula VIII and the base B to form a parabanic acid ring, one of whose carbonyl groups is (thio)acetalised or aminalised.

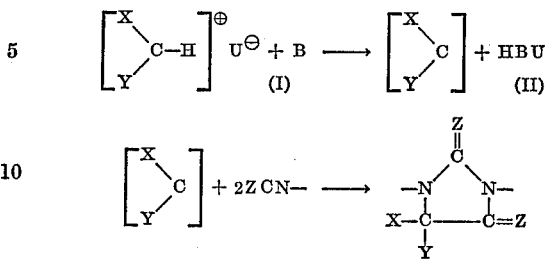

The polyparabanic acid derivatives thus obtained can contain terminal NC- or NCS-groups and thus permit crosslinking with the substances commonly used in isocyanate chemistry, for example polyols or polyamines, or crosslinking to form isocyanurate structures. Chain extensions to form carbodiimide or uretdione structures are also possible.

It is also possible to use other polymeric substances, for example, polyesters, polyamides, polyurethanes, polyolefins, polyacetals, polyepoxides, polyimides polyamidines, polyimide isocyanates, polyhydantoins, in the process according to the invention. Materials of this kind can be added to the completed polymers of the invention, although they can also be copolymerised with them.

In one particular embodiment of the process, polyesters containing hydroxyl groups are simultaneously used, together with excess quantities of iso(thio)cyanate components, which leads to a combination of parabanic acid and urethane formation. For this purpose, mixtures of a polyhydroxyl compound, a polyiso(thio)cyanate (derivative) and a compound of the General Formula IV, VI or VIII, for example, are converted into the plastics material in a simultaneous final operation, optionally after two of these components have been precondensed.

Suitable hydroxyl group-containing polyesters include the known materials which can be obtained by known methods from polycarboxylic acids, for example succinic acid, adipic acid, sebacic acid, phthalic acid, isophthalic acid, terephthalic acid or oleic acids and polyalcohols, for example ethylene glycol, diethylene glycol, triethylene glycol, propylene glycol, dipropylene glycol, glycerine, trimethylol, propane and pentaerythritol.

The polymers thus obtained are temperature-resistant plastics which remain stable at temperatures of up to about $400°$ C., show outstanding mechanical properties and which may be used as lacquers, films, etc. They may contain the additives normally used in plastics such as fillers, pigments, antioxidants and plasticisers.

EXAMPLE 1

222 parts by weight of bis-[1,3-diphenyl-imidazolidinyl-idine-(2)] and 117 parts by weight of hexamethylene-1,6-diisocyanate are heated for 24 hours at $110°$ C. under nitrogen in 2000 parts by weight of absolute toluene. Following removal of the solvent, there are obtained 370 parts by weight of a solid polymer having an NCO content of 0.8%, a molecular weight of 15,000 and the infra-red absorption characteristic of parabanic acid rings. Xylene, mesitylene, chlorobenzene or dichlorobenzene can be used instead of the toluene.

EXAMPLE 2

222 parts by weight of bis-[1,3-diphenyl-imidazolidinyl-idene-(2)] and 181 parts by weight of methylcyclohexyl-2,4-diisocyanate are heated under nitrogen for 2 hours at $110°$ C. in 2000 parts by weight of absolute toluene. The polymer which initially accumulates in the form of an oil solidifies on cooling and stirring. Following removal of the solvent, 398 parts by weight of a solid polymer

EXAMPLE 3

298 parts by weight of bis-(3-methylbenzthiazolinyl-idene-(2)] and 336 parts by weight of hexamethylene diisocyanate are heated under nitrogen for 5 hours at 100° C. and then for 10 hours at 130° C., in 2500 parts by weight of o-dichlorobenzene. Following removal of the solvent in vacuo, the residue is dissolved in chloroform and precipitated with methanol. 610 parts by weight of a solid polymer, showing the infra-red absorption characteristic of parabanic acid derivatives, are obtained.

EXAMPLE 4

222 parts by weight of bis-[1,3-diphenyl-imidazolidinyl-idene-(2)] and 320 parts by weight of m-phenylene diisocyanate are heated under reflux for 20 hours under nitrogen in 2000 parts by weight of absolute toluene. After cooling, the product is filtered and the residue is boiled with ether. 530 parts of a solid polymer are obtained as the residue.

EXAMPLE 5

222 parts by weight of bis-[1,3-diphenyl-imidazolidinyl-idene-(2)] and 210 parts by weight of naphthalene-1,5-diisocyanate are heated under reflux for 28 hours in a nitrogen atmosphere in 2000 parts by weight of absolute toluene. After filtration, 400 parts by weight of a solid polymer, with the characteristic infra-red absorption, are obtained.

EXAMPLE 6

175 parts by weight of tolylene-2,4-diisocyanate and 222 parts by weight of bis-[1,3-diphenyl-imidazolidinyl-idene-(2)] are heated under reflux for 7 hours in a nitrogen atmosphere in 2000 parts by weight of absolute xylene. Following removal of the solvent, 340 parts by weight of a solid polymer, with the infra-red absorption characteristic of polyparabanic acid derivatives, are obtained.

EXAMPLE 7

298 parts by weight of bis-[3-methylbenzthiazolinyl-idene-(2)] and 500 parts by weight of diphenylmethane-4,4'-diisocyanate are heated for 2 hours at 90 to 110° C. in a nitrogen atmosphere in 2500 parts by weight of o-dichlorobenzene. After the solvent has been poured off, and the residue dissolved in chloroform, the polymer is precipitated with methanol. 780 parts by weight of a solid polymer, with the infra-red absorption characteristic of parabanic acid derivatives, are obtained.

EXAMPLE 8

222 parts by weight of bis-[1,3-diphenyl-imidazolidinyl-idene-(2)] and 250 parts by weight of diphenylmethane-4,4'-diisocyanate are heated at boiling point for 9 hours in a nitrogen atmosphere in 2000 parts by weight of absolute xylene. After cooling and removal of the solvent, 430 parts by weight of a solid polymer, with the infra-red absorption characteristic of parabanic acid derivatives, are obtained.

EXAMPLE 9

222 parts by weight of bis-[1,3-diphenyl-imidazolidinyl-idene-(2)] and 247 parts by weight of triphenylmethane-4,4',4''-triisocyanate are heated under reflux for 5 hours in a nitrogen atmosphere in 2000 parts by weight of absolute xylene. Following removal of the solvent, 453 parts by weight of a solid polymer, with the infra-red absorption characteristic of parabanic acid rings, are obtained.

EXAMPLE 10

222 parts by weight of bis-[1,3-diphenyl-imidazolidinyl-idene-(2)] and 465 parts by weight of thiophosphoric acid-O,O,O-triphenyl ester-4,4',4''-triisocyanate in 2000 parts by weight of absolute xylene were heated at boiling point for 6 hours in a nitrogen atmosphere. Following removal of the solvent, 630 parts by weight of a solid polymer, with the infra-red absorption characteristic of parabanic acid rings, are obtained.

EXAMPLE 11

1500 parts by weight of orthoformic acid triethyl ester and 1250 parts by weight of diphenylmethane-4,4'-diisocyanate are heated for 7½ hours at 140° C. After precipitation with petroleum ether, and removal of the solvent, 1500 parts by weight of a solid polymer with an NCO content of 4.0% are obtained.

EXAMPLES 12 TO 17

A parts by weight of hexamethylene diisocyanate and B parts by weight of orthoformic acid triethyl ester are heated in C parts by weight of solvent. Petroleum ether is added to the reaction mixture, the polymer is separated off and solvent residues are removed in high vacuum at 180° C. For further details see the table below.

EXAMPLE 18

500 parts by weight of diphenylmethane-4,4'-diisocyanate and 1000 parts by weight of orthoformic acid triethyl ester are heated for 15 hours at 162° C. in 1500 parts by weight of o-dichlorobenzene. After the solvent has been removed and the residue treated with petroleum ether, 760 parts of a solid polymer are obtained.

EXAMPLE 19

520 parts by weight of tolylene-2,4-diisocyanate are heated for 10 hours at 145° C. in 1500 parts by weight of orthoformic acid triethyl ester. After the solvent has been removed and the residue treated with petroleum ether, 610 parts by weight of a solid polymer are obtained.

EXAMPLE 20

630 parts by weight of naphthylene-1,5-diisocyanate and 1500 parts by weight of orthoformic acid triethyl ester are heated for 10 hours at 145° C. After the solvent has been removed, 910 parts by weight of a solid polymer are obtained.

EXAMPLE 21

700 parts by weight of thiophosphoric acid-O,O,O-triphenyl ester-4,4',4''-triisocyanate were heated for 5 hours at 145° C. in 1500 parts by weight of orthoformic acid triethyl ester. After the solvent has been removed and the residue treated with petroleum ether, 900 parts by weight of a glass-like polymer are obtained.

EXAMPLE 22

Equal weights of diphenylmethane-4,4'-diisocyanate and orthorformic acid triethyl ester are stoved on a metal sheet for 4 hours at 100° C. and then for 1 hour at 200° C. A lacquer with very good mechanical properties is obtained.

EXAMPLE 23

101 parts by weight of triethylamine are added in a nitrogen atmosphere to 277 parts by weight of N-methyl benzthiazolium iodide and 250 parts by weight of diphenylmethane-4,4'-diisocyanate in 1700 parts by weight of dry acetonitrile. After stirring for 1 hour, the polymer formed is separated off from the solvent and dried in vacuo. Yield: 390 parts by weight.

TABLE

| Hexamethylene diisocyanate, parts by weight (A) | Ortho ester, parts by weight (B) | Solvent, parts by weight (C) | Reaction Time, hours | Reaction Temp., °C | NCO content of the polymer, percent | Viscosity, cp. 25° C. | Catalyst | Yield, parts by weight |
|---|---|---|---|---|---|---|---|---|
| 670 | 1,500 | 1,500 ortho ester | 82 | 140 | 16.0 | 160.7 | | 790 |
| 670 | 1,000 | 1,500 o-dichlorobenzene | 6 | 160 | 13.0 | 505.5 | | 460 |
| 500 | 700 | 1,050 o-dichlorobenzene | 8 | 160 | 17.2 | 154.7 | | 403 |
| 500 | 700 | do | 15 | 160 | 14.0 | 661.05 | | 551 |
| 670 | 1,000 | 1,500 o-dichlorobenzene | 61 | 160 | 10.8 | 100,000 | | 995 |
| 670 | 1,000 | do | 46 | 165 | | Solid | 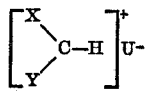 | 740 |
| 1,000 | 1,400 | 2,100 o-dichlorobenzene | 20 | 165 | 9.95 | 46,339 | | 1,240 |

We claim:

1. A polyparabanic acid derivative having a molecular weight of from 500 to 50,000 and containing structural units of the formula:

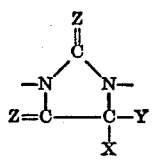

linked together by a divalent, trivalent or tetravalent hydrocarbon or substituted hydrocarbon, Z being oxygen or sulphur and X and Y each being selected from the group —$NR_1R_2$, —$OR_1$ and —$SR_1$ wherein $R_1$ is alkyl, substituted alkyl, cycloalkyl, substituted cycloalkyl, aryl or substituted aryl and $R_2$ is hydrogen or one of said radicals defining $R_1$.

2. A process for producing a polyparabanic acid derivative as claimed in claim 1 which comprises reacting a polyisocyanate with an electron-rich olefinically unsaturated compound of the formula:

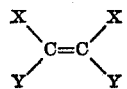

at a temperature of from 20 to 500° C.

3. A process as claimed in claim 2 wherein the electron-rich olefinically unsaturated compound is bis-[1,3-diphenyl - imidazolidinylidene-(2)], bis-[3-methyl-benzthiazolidinylidene-(2)] or tetrakis - (dimethylamino)-ethylene.

4. A process for producing a polyparabanic acid derivative as claimed in claim 1 which comprises reacting a polyisocyanate or polyisothiocyanate or with a methane derivative of the formula:

at a temperature of from —100 to +500° C.

5. A process as claimed in claim 4 wherein the methane derivative is an alkyl or aryl ester of orthoformic acid, a corresponding thioester, an orthoformic acid amide, N,N-dimethyl formamide diethyl acetal or a tetraalkyl formamidine alkyl ester.

6. A process for producing a polyparabanic acid derivative as claimed in claim 1 which comprises reacting a polyisocyanate or polyisothiocyanate and a base, with a salt of the formula:

wherein
U represents an organic or inorganic anion,
at a temperature in the range from —100 to +500° C.

7. A process as claimed in claim 6 wherein the salt of said formula is: 1,3-diphenyl-imidazolium chloride, N-methyl-benzthiazolium chloride or 3,4,5-trimethyl-thiazolium methosulphate.

8. A process as claimed in claim 6 wherein the base is a mono-, di- or tri-alkylamine, a heterocyclic compound having at least one nitrogen atom in the ring, a metal alcoholate or an organometallic compound.

9. A process as claimed in claim 2 wherein the reaction is carried out in the presence of an excess of the polyisocyanate and in the presence of a polyester having hydroxyl groups.

References Cited
UNITED STATES PATENTS

| | | | |
|---|---|---|---|
| 3,397,253 | 8/1968 | Merten et al. | 260—77.5 CH |
| 3,549,599 | 12/1970 | Merten | 260—77.5 CH |
| 3,642,524 | 2/1972 | Merten et al. | 260—77.5 CH |

DONALD E. CZAJA, Primary Examiner

M. J. WELSH, Assistant Examiner

U.S. Cl. X.R.

260—77.5 R, 309.5, 830 P, 858, 860